3,649,422
COLORED DIAPOSITIVE FILM
Keishi Kubo and Kiyoshi Sakai, Tokyo, Japan, assignors to Kabushiki Kaisha Ricoh, Tokyo, Japan
No Drawing. Filed Jan. 22, 1969, Ser. No. 793,181
Claims priority, application Japan, Jan. 30, 1968,
43/5,640
Int. Cl. G03c 1/78
U.S. Cl. 161—2   5 Claims

ABSTRACT OF THE DISCLOSURE

A colored diapositive film for use in projection is prepared by contacting a colored, substantially transparent thermoplastic film with an original having an image thereon, and irradiating infrared rays through said thermoplastic colored film, thereby forming on said colored film an image corresponding to said original image and consisting of an aggregation of fine wrinkles having lower transparency than the remainder of said thermoplastic colored film.

BACKGROUND OF THE INVENTION

Field of the invention

The present invention relates to a colored diapositive film (an image-carrying colored original film) for use in projection which comprises contacting a colored, substantially transparent thermoplastic film with an original having an image thereon, and irradiating infrared rays through said colored film, thereby forming on said colored film an image corresponding to said original image and consisting of an aggregation of fine wrinkles having lower transparency than the remainder of said colored film.

Description of the prior art

Thermoplastic films such as polypropylene film, polyethylene film, polystyrene film, etc. become soft when they are heated.

The inventors have been well acquainted with the fact that when said type of film is contacted with an original having an image thereon and irradiated with infrared rays through said film, the heat transfer rate from the imaged area and the non-imaged area of said original to said film varies respectively depending on the infrared absorption rate thereat, thus resulting in the presentation of the phenomenon of thermal shrinkage or thermal softening only in such parts of the film as have been contacted with the imaged area of the original to form an image consisting of an aggregation of fine wrinkles, corresponding to said imaged area. When a film having such image is projected on a screen by means of a projection machine such as an overhead projector, viewscope, etc., the aforementioned image area consisting of an aggregation of fine wrinkles is produced as an image of dark or black shadow on a bright background.

SUMMARY OF THE INVENTION

The object of the present invention is to provide a colored diapositive film so designed as to produce a bright colored background on a screen corresponding to the non-imaging area of the original film by projection.

Such colored diapositive films will not only serve to facilitate prompt assortment and classification in the field of education or research presentation but also serve much in classifying graphs and tables and they will also be very effective in making the shadow image much clearer in strong relief against the colored background when projected on the screen as compared with other films whose non-imaging area is made colorless and transparent.

As for thermoplastic films (or sheets) applicable to the present invention, such films as those made of polypropylene, polystyrene, polyethylene, etc. are colored with inorganic or organic coloring agents such as pigments or dyes. Of the heat shrinking ratios of these films for the purpose of the present invention, for example, in polypropylene film it is preferred that it does not exceed respectively 5.0% in biaxial directions after having been heated at 120° C. for one minute or does not exceed the range of 1.0% in one axial direction and 15.0% in the other axial direction after having been heated under the same conditions as mentioned in the above, while in polystyrene film it is suitable that the heat shrinking ratio is within the range of 8.0% in biaxial directions after having been heated at 100° C. for one minute, respectively.

Even in the case of a film which does not satisfy the heat shrinking ratios mentioned in the foregoing, it may be suitable for the purpose of the present invention if it is submitted to heat treatment which comprises keeping a film in the oven at the temperature of 80–90° C. for two or three days or dipping it in a hot water bath at 80–90° C. for five to ten minutes. The thickness of the film used in the present invention is preferably within 20–200µ.

There are applied various methods in coloring said thermoplastic film, such as mixing and dispersing pigments or dyes in the resin, and molding the mixture into a film or steeping a colorless film prepared by conventional molding methods in a dyeing solution bath, according to an ordinary dyeing method. However, care should always be exercised in coloring a film so that too much coloring may not result in a decrease of the transparency of the film thus colored. The coloring agents such as pigments or dyes should therefore be mixed in such a way as to make the luminous transmittance of the colored film at the maximum absorption wave length therethrough exceed approximately 40%. Any kinds of pigments or dyes may be used in the present invention so long as they can be mixed and dispersed homogeneously in the thermoplastic resin or can dye the colorless film by the dipping method; however, the more excellent it is in resistance to light, the more satisfactory it is in the present invention.

DESCRIPTION OF THE PREFERRED EMBODIMENTS

Example 1

One part by weight of a red pigment consisting of cadmium (Cadmium Red manufactured and sold by Dainich Seika Colour and Chemical Mfg. Co. under the trade name of "Masterbach" PPM) was added to 29 parts by weight of polypropylene resin (polypropylene resin manufactured and sold by Mitsubishi Petrochemical Industries, Ltd. under the trade name of "Mitsubishi Noblen" FA–3). They were mixed in the roll mill and then molded into a red colored film of 30µ thickness according to an ordinary technique of melt extrusion using a T-die. The heat shrinking ratio of the film was 0.5% in one axial direction and 10.5% in other axial direction when measured after having been heated at 120° C. for one minute. Its luminous transmittance was 68% at 570 mµ.

The film thus obtained was cut into a piece about the size of 21 x 30 cm., kept in contact with a sheet of printed newspaper in a silk screen carrier, and then run through a copying machine (Thermofax model 47) having infrared lamps for exposure to infrared rays at the rate of 5.8 cm. per second. As the result of this process, a red-colored diapositive film for use in projection was obtained with an image consisting of an aggregation of fine wrinkles formed thereon reproducing the image of the aforementioned newspaper print with complete fidelity. When this diapositive film was put on an ordinary, commercially available magnifying projection machine (overhead projector) to project the image on a screen, an image of black shadow was produced very clearly and distinctly on a bright red-colored background, and the contrast was also very satisfactory.

Example 2

One part by weight of a blue pigment obtained from phthalocyanine (phthalocyanine blue manufactured and sold by Dainichi Seika Colour and Chemical Mfg. Co. under the trade name of "Masterbach" NPM) was added to 29 parts by weight of polystyrene resin (polystyrene resin manufactured and sold by Mitsubishi Monsant Chemical Co. under the trade named of "Dialex" resin HT–500). They were mixed in the roll mill and then melt extruded by the use of a T-die according to an ordinary method. The extruded film was cooled to 90° C. and then put on the tenter to be stretched three times the length and width of the original dimension at 120° C. A transparent blue colored polystyrene film having a thickness of $30\mu$ was obtained. The luminous transmittance of the film was 62% at 500 m$\mu$. Thus a blue-colored diapositive film was obtained by the same treatment as mentioned in Example 1.

When this diapositive film was put on the same projection machine that was used in Example 1 to project the magnified image on the screen, a shadow image of good contrast was produced clearly and distinctly on a bright blue-colored background.

Example 3

Polystyrene resin (polystyrene resin manufactured and sold by Mitsubishi Monsant Chemical Co. under the trade name of "Dialex" resin HF–77) was melt extruded by the use of a T-die according to an ordinary method. The extruded film was cooled to 90° C. and then put on the tenter to be stretched three times the length and width of the original dimension at 120° C. and was formed into a transparent and colorless film having a thickness of $50\mu$. Heat treatment was then applied by dipping the film in a hot water bath at 90° C., for two minutes so that the heat shrinking ratio of the film at 100° C. for one minute may be controlled to 7% in one axial direction and 1% in other axial direction. The luminous transmittance of the film thus treated was 70% at 570 m$\mu$.

A dyeing solution consisting of 0.7 part by weight of metal containing yellow type spirit-soluble dye (yellow dye manufactured and sold by Hodogaya Chemical Co., Ltd. under the trade name of "Aizen Spilon Yellow"–GRH), 70 parts by weight of methanol, and 30 parts by weight of methyl Cellosolve was prepared, wherein the film whose heat shrinking ratio had been controlled as mentioned above was dipped at 20° C. for three minutes to prepare a transparent yellow colored film. The film was then treated according to the method in Example 1 to obtain a yellow-colored diapositive film for use in projection.

When this original film was put on the same projection machine that was used in Example 1 to project a magnified image on a screen, a clear and distinct image having a good contrast was produced on a bright yellow colored background.

What we claim is:

1. A colored diapositive film whose image can be projected as a shadow image on a bright colored background, comprising a thermoplastic, transparent, colored film having on the surface thereof an image consisting of an aggregation of the fine wrinkles, said image having a luminous transmittance lower than that of the remainder of said thermoplastic, transparent, colored film, said thermoplastic film having a luminous transmittance of about 40% or more at the maximum absorption wave length.

2. A colored diapositive film according to claim 1, wherein said thermoplastic film is one of the group consisting of colored polypropylene film, colored polystyrene film, and colored polyethylene film.

3. A colored diapositive film according to claim 2, wherein the heat shrinking ratio of said colored polypropylene film is 5.0% or less in biaxial directions when heated at 120° C. for one minute, respectively, the heat shrinking ratio of said colored polypropylene film is 1.0% or less in an axial direction and 15.0% or less in the other axial direction when heated at 120° C. for one minute, and the heat shrinking ratio of said colored polystyrene film is 8.0% or less in biaxial directions when heated at 100° C. for one minute, respectively.

4. A colored diapositive film according to claim 1, wherein said thermoplastic film contains one of the group consisting of pigments and dyes.

5. A colored diapositive film according to claim 1, wherein the thickness of said thermoplastic film ranges between about $20\mu$ and $200\mu$.

References Cited
UNITED STATES PATENTS

| 1,149,693 | 8/1915 | Smith | 40—152 |
| 1,309,183 | 7/1919 | Cochrane | 40—152 |
| 2,054,848 | 9/1936 | Bowker | 161—6 |
| 2,762,153 | 9/1956 | Knode | 161—3 |
| 2,916,840 | 12/1959 | Perrot | 40—152 |
| 3,203,127 | 8/1965 | Pettersson | 40—152 |
| 3,264,164 | 8/1966 | Jerothe et al. | 161—33 |
| 3,389,029 | 6/1968 | Forman et al. | 161—6 X |
| 3,424,640 | 1/1969 | Hines et al. | 161—6 |

HAROLD ANSHER, Primary Examiner

U.S. Cl. X.R.

40—152; 95—1; 161—6, 18, 138, 164, 165, 408, 410, 413; 353—120